United States Patent
Hanya et al.

(10) Patent No.: US 6,768,612 B2
(45) Date of Patent: Jul. 27, 2004

(54) DISC DRIVE SUSPENSION HAVING AN INDEPENDENT HINGE MEMBER

(75) Inventors: Masao Hanya, Yokohama (JP); Chihiro Kono, Yokohama (JP); Toshiki Ando, Aiko-gun (JP)

(73) Assignee: NHK Spring Co., Ltd., Yokohama (JP)

( * ) Notice: Subject to any disclaimer, the term of this patent is extended or adjusted under 35 U.S.C. 154(b) by 29 days.

(21) Appl. No.: 10/161,788

(22) Filed: Jun. 4, 2002

(65) Prior Publication Data

US 2003/0107843 A1 Jun. 12, 2003

(30) Foreign Application Priority Data

Dec. 7, 2001 (JP) ........................................ 2001-374535

(51) Int. Cl.⁷ ................................................. G11B 5/48
(52) U.S. Cl. ................................................... 360/244.8
(58) Field of Search .......................... 360/244.8, 244.5, 360/244.3, 244.2

(56) References Cited

U.S. PATENT DOCUMENTS

| | | | |
|---|---|---|---|
| 4,167,765 A | | 9/1979 | Watrous |
| 4,884,154 A | * | 11/1989 | Onodera et al. ......... 360/244.9 |
| 4,991,045 A | * | 2/1991 | Oberg ..................... 360/244.3 |
| 5,081,553 A | * | 1/1992 | Wanlass et al. .......... 360/244.9 |
| 5,185,683 A | * | 2/1993 | Oberg et al. ............. 360/244.6 |
| 5,201,458 A | * | 4/1993 | Hagen ......................... 228/199 |
| 5,299,081 A | * | 3/1994 | Hatch et al. ............. 360/244.2 |
| 5,526,205 A | * | 6/1996 | Aoyagi et al. ......... 0360/244.2 |
| 5,543,985 A | * | 8/1996 | Donnelly et al. ........ 360/244.9 |
| 5,754,358 A | * | 5/1998 | Yatsu ....................... 360/78.09 |
| 5,777,826 A | * | 7/1998 | Tsuchida et al. ......... 360/244.9 |
| 5,870,252 A | * | 2/1999 | Hanrahan ................ 360/244.8 |
| 5,901,016 A | * | 5/1999 | Iwamoto ................... 360/245.9 |
| 5,914,835 A | * | 6/1999 | Girard et al. ............ 360/244.8 |
| 5,936,804 A | * | 8/1999 | Riener et al. ............ 360/244.9 |
| 5,991,122 A | | 11/1999 | Tangren et al. |
| 6,014,290 A | | 1/2000 | Supramaniam et al. |
| 6,043,956 A | * | 3/2000 | Hanya et al. ............. 360/244.9 |
| 6,163,953 A | * | 12/2000 | Shiraishi et al. ......... 29/603.03 |
| 6,381,099 B1 | * | 4/2002 | Mei ........................ 360/244.3 |
| 6,388,842 B1 | * | 5/2002 | Murphy ................... 360/244.8 |
| 6,417,995 B1 | * | 7/2002 | Wu et al. .................... 360/245 |
| 6,433,967 B1 | * | 8/2002 | Arya ....................... 360/244.8 |
| 6,515,832 B1 | * | 2/2003 | Girard ..................... 360/245.3 |
| 6,529,350 B1 | * | 3/2003 | Itoh ........................ 360/264.2 |
| 6,552,877 B2 | * | 4/2003 | Tokuyama et al. ....... 360/245.7 |
| 6,597,538 B1 | * | 7/2003 | Kashima et al. ......... 360/244.5 |

FOREIGN PATENT DOCUMENTS

JP 2001-155458 6/2001

OTHER PUBLICATIONS

Related U.S. application Ser. No. 10/161,813, filed Jun. 4, 2002; Inventors: Noriyuki Saito et al; Title: Disc Drive Suspension.
Related U.S. application Ser. No. 10/161,789, filed Jun. 4, 2002, Inventors: Eiji Watadani et al; Title: Disc Drive Suspension.

* cited by examiner

Primary Examiner—A. J. Heinz
Assistant Examiner—Angel Castro
(74) Attorney, Agent, or Firm—Frishauf, Holtz, Goodman & Chick, P.C.

(57) ABSTRACT

A suspension comprises a load beam, a base plate, and a hinge member. The hinge member has an end portion lapped and fixed on the proximal portion of the load beam, a base plate mounting portion lapped and fixed on the base plate, and flexible portions situated between the end portion and the base plate mounting portion. The flexible portions are situated individually on the opposite sides of an opening formed in the hinge member, and are elastically deformable in its thickness direction. An end portion of the base plate and the hinge member are fixed on each other by means of laser welds in positions near the flexible portions. The laser welds are formed individually in regions that extend in the axial direction of the hinge member from the flexible portions.

3 Claims, 8 Drawing Sheets

DISC DRIVE SUSPENSION HAVING AN INDEPENDENT HINGE MEMBER

CROSS-REFERENCE TO RELATED APPLICATIONS

This application is based upon and claims the benefit of priority from the prior Japanese Patent Application No. 2001-374535, filed Dec. 7, 2001, the entire contents of which are incorporated herein by reference.

BACKGROUND OF THE INVENTION

1. Field of the Invention

The present invention relates to a disc drive suspension incorporated in an information processing apparatus such as a personal computer.

2. Description of the Related Art

Figure 15:
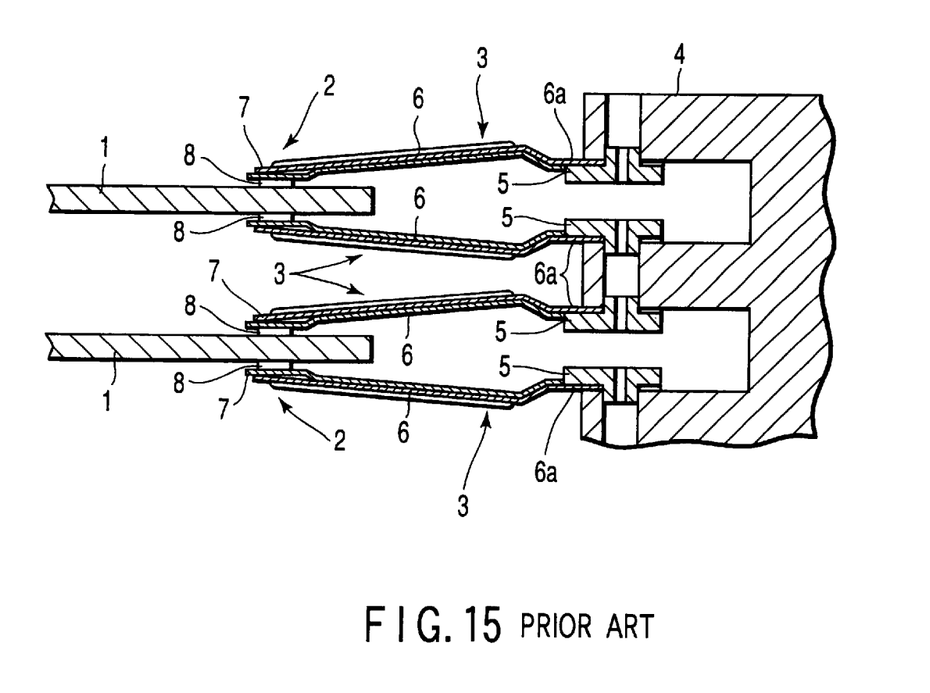
FIG. 15 is a sectional view of a part of a hard disc drive provided with conventional suspensions.

FIG. 15 shows a part of a hard disc drive (HDD). This disc drive comprises suspensions 3 and actuator arms 4 on which the suspensions 3 are mounted, individually. Each suspension 3 supports a magnetic head portion 2 for recording information on or reading it from the recording surface of a disc 1 for use as a recording medium. The actuator arms 4 are turned around a shaft (not shown) by means of a positioning motor (not shown).

Each suspension 3 is provided with a base plate 5, a load beam 6 extending from the base plate 5 toward the head portion 2, a flexure 7, etc. A proximal portion 6a of the load beam 6 is lapped and fixed on the base plate 5. The flexure 7 is fixed on the load beam 6 by laser welding. A slider 8 that constitutes the head portion 2 is mounted on the distal end portion of the flexure 7.

A suspension in which a load beam and a base plate are coupled to each other by means of a hinge member has been developed as an alternative form. This hinge member has an end portion lapped and fixed on the proximal portion of the load beam, a base plate mounting portion lapped and fixed on the base plate by laser spot welding or the like, and elastically deformable flexible portions formed between the end portion and the base plate mounting portion.

If the hinge member and the base plate are fixed on each other in a plurality of positions by laser spot welding, the load beam may easily flutter (or its distal end portion may waver in its width direction), depending on the laser weld positions. Thus, it was found that the flutter characteristic of this suspension should be improved.

BRIEF SUMMARY OF THE INVENTION

Accordingly, the object of the present invention is to provide a disc drive suspension provided with a hinge member capable of improving its flutter characteristic.

The present invention is applicable to a suspension that comprises a Load beam, a base plate, and a hinge member. The hinge member has an end portion lapped and fixed on the proximal portion of the load beam, a base plate mounting portion lapped and fixed on the base plate, and flexible portions elastically deformable in the thickness direction thereof and situated individually on the opposite sides of an opening formed between the end portion and the base plate mounting portion. The hinge member and an end portion of the base plate are fixed to each other by means of laser welds in positions near the flexible portions, and the laser welds are formed individually on at least two spots in each of regions extending in the axial direction of the hinge member from the flexible portions.

According to this invention, the flutter characteristic and performance of the suspension that has the base plate and the hinge member fixed by laser spot welding can be improved.

Preferably, the laser welds should be formed individually in three positions corresponding to the vertices of a triangle in the region near each of the flexible portions of the hinge member, two of the three laser welds being arranged side by side in the width direction of the hinge member. According to this invention, the flutter characteristic can be improved further.

Furthermore, the laser welds may be formed individually in three positions near each of the flexible portions of the hinge member so as to be arranged side by side in the width direction of the hinge member. According to this invention, the flutter characteristic can also be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

A first embodiment of the present invention will now be described with reference to FIGS. 1 to 8.

Figure 2:
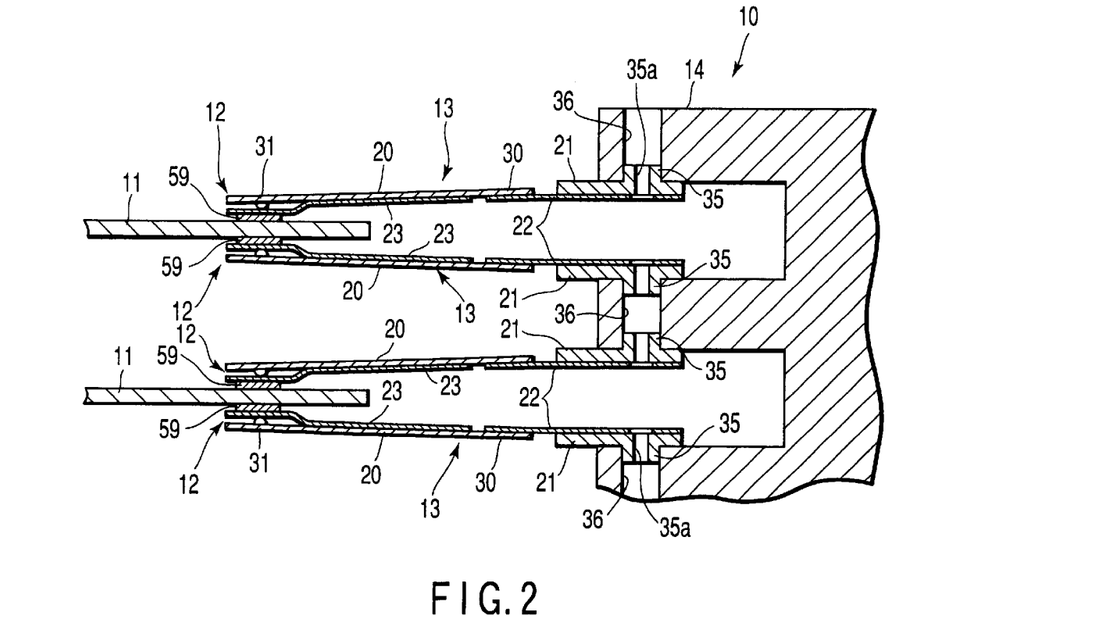
FIG. 2 is a sectional view of a part of a disc drive provided with the suspension shown in FIG. 1.

A hard disc drive (HDD) 10 shown in FIG. 2 comprises a plurality of discs 11 for use as recording media, a plurality of suspensions 13 each having a head portion 12 for magnetically recording information on or reading it from the recording surface of each disc 11, actuator arms 14, etc. Each actuator arm 14 is an example of an arm member to be fitted with each suspension 13, and can be turned around a shaft (not shown) by means of a positioning motor (not shown).

Figure 1:
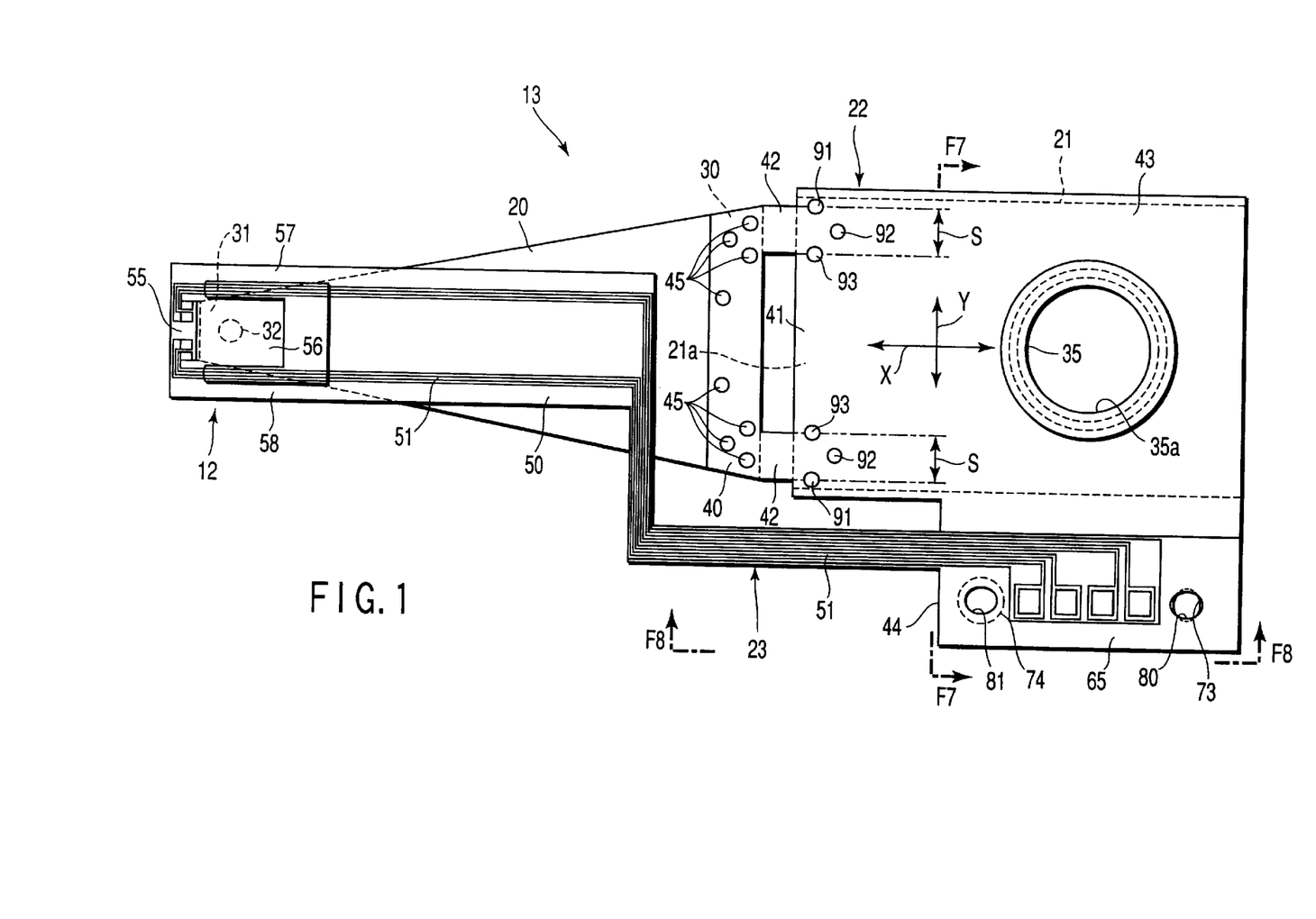
FIG. 1 is a plan view of a disc drive suspension according to a first embodiment of the invention.

As shown in FIG. 1, each suspension 13 includes a load beam 20, a base plate 21, a hinge member 22, a flexure 23, etc. The base plate 21 is formed of a stainless-steel sheet with a thickness of 0.1 mm to 0.3 mm (preferably, 0.15 mm to 0.25 mm), for example.

Figure 3:
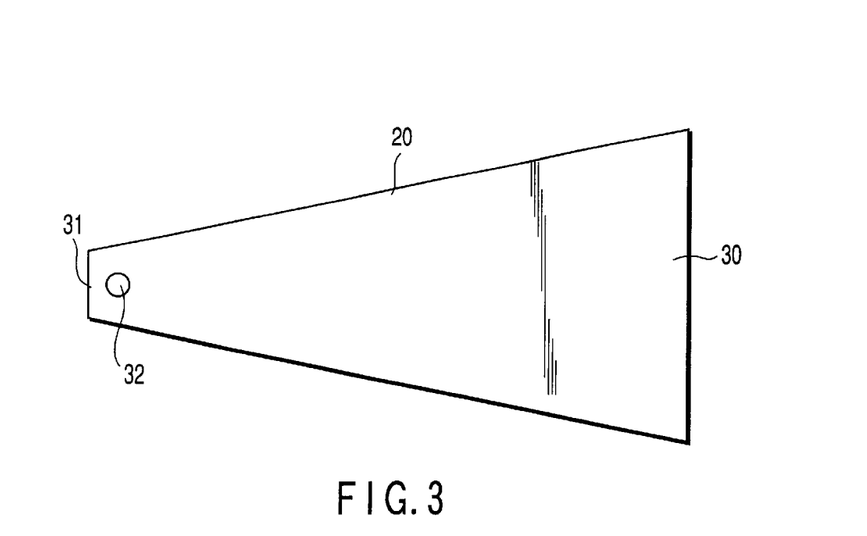
FIG. 3 is a plan view of a load beam of the suspension shown in FIG. 1.

As shown in FIG. 3, the load beam 20 has a proximal portion 30 and a distal end portion 31, and a dimple 32 is formed on the distal end portion 31.

Figure 4:
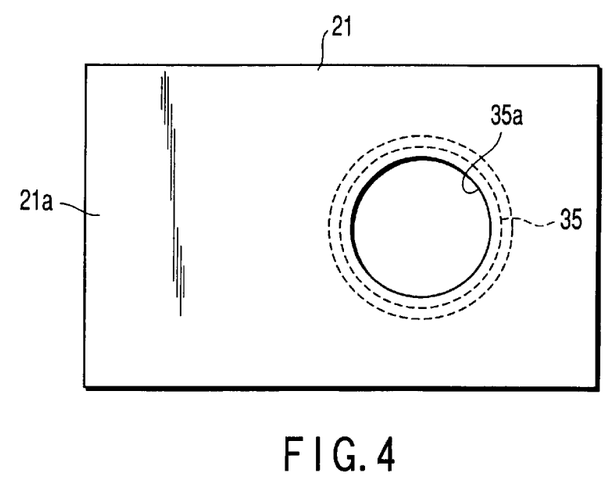
FIG. 4 is a plan view of a base plate of the suspension shown in FIG. 1.

As shown in FIG. 4, a cylindrical boss portion 35 having a circular hole 35a is formed on the base plate 21. The base plate 21 is fixed to the actuator arm 14 in a manner such that the boss portion 35 is inserted into a mounting hole 36 (shown in FIG. 2) in the arm 14 and caulked (or plastically deformed) from inside.

Figure 5:
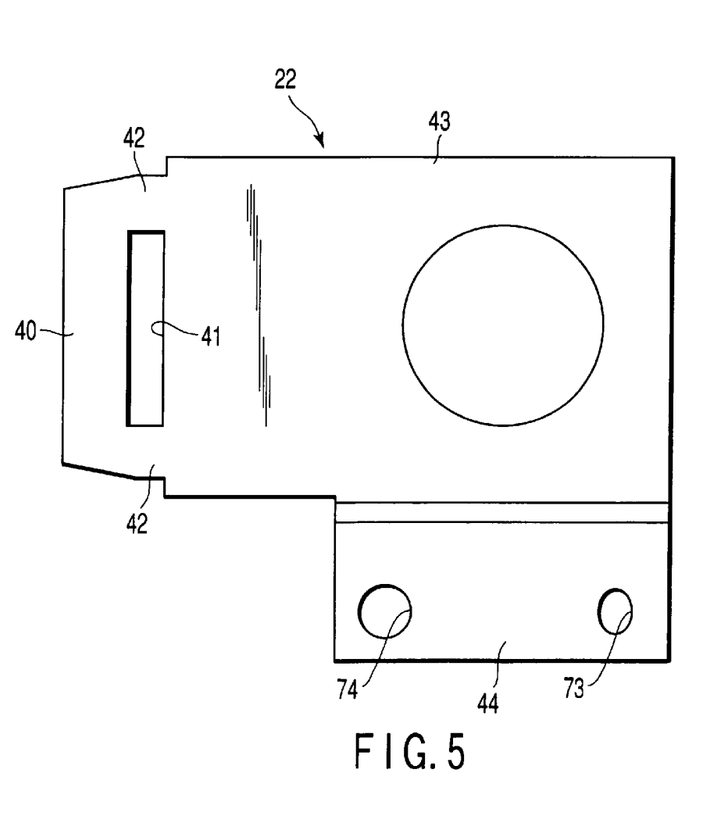
FIG. 5 is a plan view of a hinge member of the suspension shown in FIG. 1.

As shown in FIGS. 1 and 5, the hinge member 22 has an end portion 40 lapped and fixed on the proximal portion 30 of the load beam 20, flexible portions (also referred to as load bending portions) 42 formed individually on the opposite sides of an opening 41 and elastically deformable in its thickness direction, a base plate mounting portion 43 lapped and fixed on the base plate 21, and an extending portion 44 extending sideways from the mounting portion 43. The hinge member 22 is formed of a stainless-steel sheet with a thickness of 30 $\mu$m to 40 $\mu$m, for example.

The proximal portion 30 of the load beam 20 and the end portion 40 of the hinge member 22 are fixed to each other by laser spot welding. In FIG. 1, numeral 45 denotes the resulting laser welds.

Figure 6:
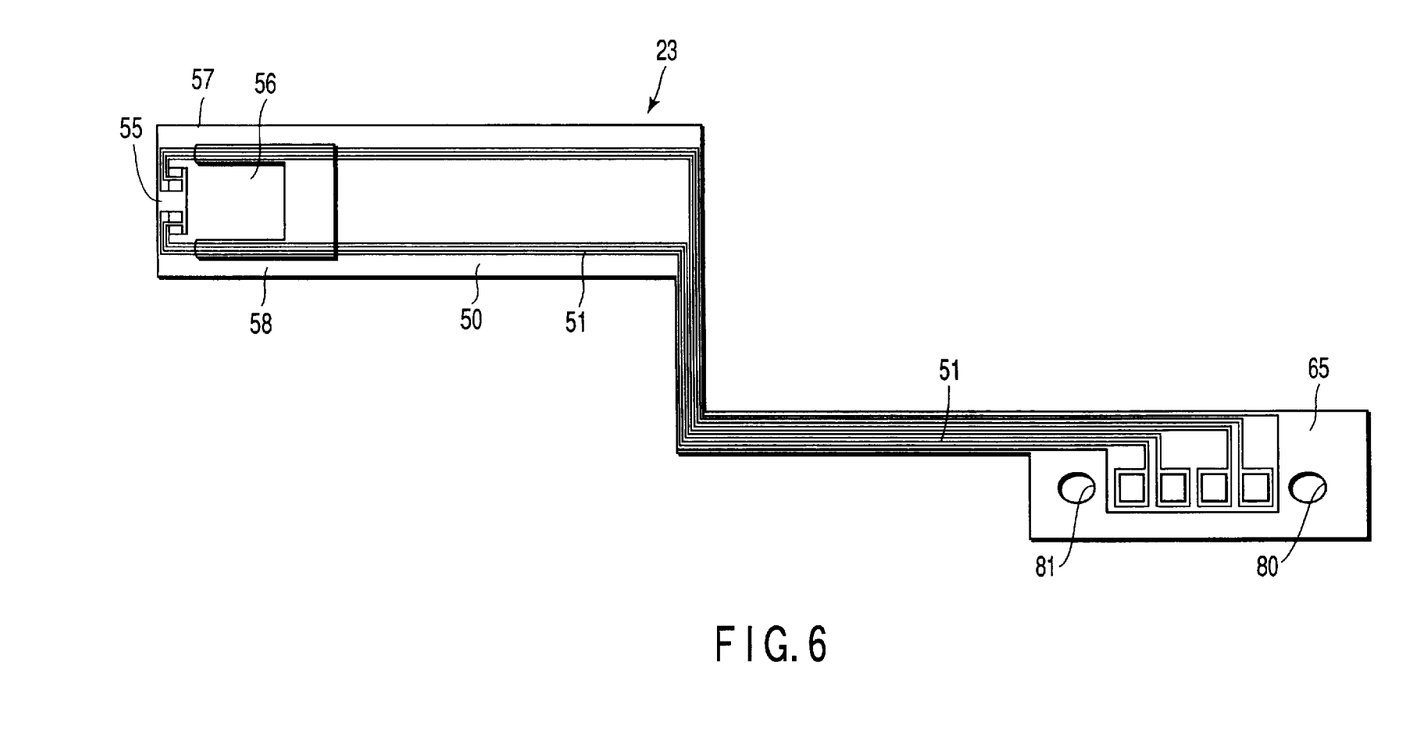
FIG. 6 is a plan view of a flexure of the suspension shown in FIG. 1.

As shown in FIG. 6, the flexure 23 has a metal base 50 formed of a metal sheet as an example of a material that is thinner than the load beam 20 and a wiring portion 51 including a conductive layer that is formed over the surface of the metal base 50 with an electrical insulating layer between them. The metal base 50 is formed of a springy stainless-steel sheet with a thickness of about 18 $\mu$m to 30 $\mu$m, for example. The flexure 23 extends along the load beam 20.

A tongue portion 56 that serves as a movable portion and outrigger portions 57 and 58 are formed on one end portion 55 of the flexure 23. The outrigger portions 57 and 58 are situated individually on the opposite sides, left and right, of the tongue portion 56. The tongue portion 56 and the outrigger portions 57 and 58 can bend in the thickness direction of the flexure 23. The tongue portion 56 engages a dimple 32 on the distal end portion 31 of the load beam 20. A slider 59 (shown in FIG. 2) is mounted on the tongue portion 56. The slider 59 is provided with a transducer (not shown) for use as a magneto-electric conversion element. The transducer, slider 59, etc. constitute the head portion 12.

The other end portion 65 of the flexure 23 is lapped and fixed on the extending portion 44 of the hinge member 22. The extending portion 44 of the hinge member 22 is formed having holes 73 and 74 in which positioning pins can be inserted individually. The end portion 65 of the flexure 23 is also formed having holes 80 and 81 for the insertion of the positioning pins.

Figure 7:
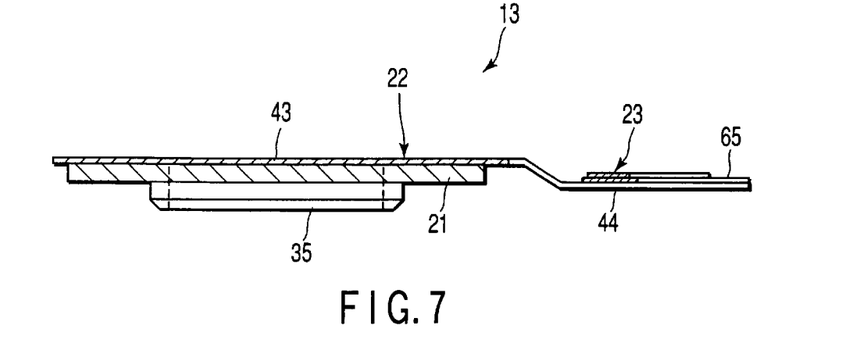
FIG. 7 is a sectional view of the suspension taken along line F7—F7 of FIG. 1.
Figure 8:
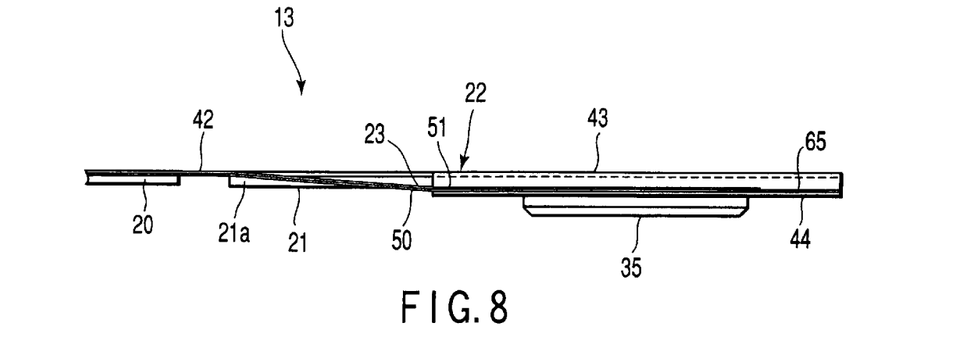
FIG. 8 is a side view of a part of the suspension taken in the direction of arrow F8 of FIG. 1.

As shown in FIGS. 7 and 8, the base plate 21 and the base plate mounting portion 43 of the hinge member 22 are lapped and fixed to each other by laser welding.

More specifically, as shown in FIG. 1, an end portion 21a of the base plate 21 and the hinge member 22 are fixed to each other near the flexible portions 42 by means of laser welds 91, 92 and 93. These welds 91, 92 and 93 are formed on regions S that extend from the flexible portions 42 in the direction of an axis X of the hinge member 22.

In the case of this embodiment, the laser welds 91, 92 and 93 that are situated near their corresponding flexible portions 42 are formed individually in positions corresponding to the vertices of triangles, as shown in FIG. 1. Among these laser welds 91, 92 and 93, the first and third welds 91 and 93 are arranged in the width direction (indicated by arrow Y) of the hinge member 22 along the flexible portions 42. At least a part of each of the first and third welds 91 and 93 and the whole of the second welds 92 are situated in the regions S. Besides these laser welds 91, 92 and 93, some laser welds may be formed at the junction of the base plate 21 and the hinge member 22.

Figure 9:
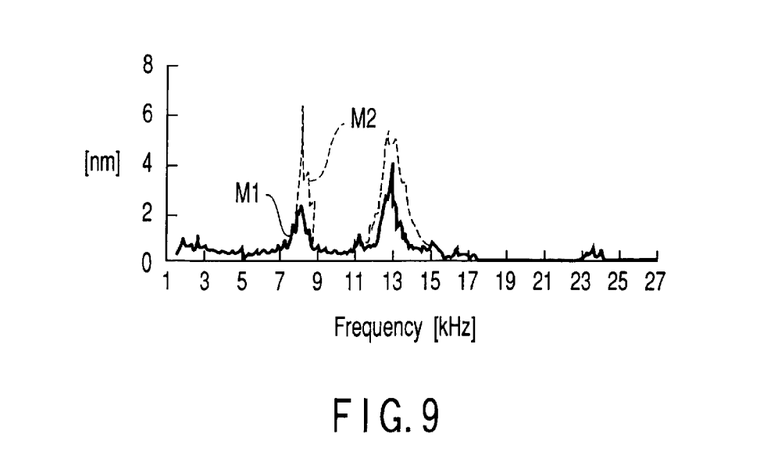
FIG. 9 is a diagram showing the flutter characteristic of the suspension shown in FIG. 1.

Full line M1 shown in FIG. 9 represents the result of measurement of the flutter characteristic of the suspension 13. The flutter characteristic was obtained by measuring the amplitude of each frequency of vibration of the head portion 12 in the sway direction (width direction of the head portion 12) by means of a sensor.

In FIG. 9, two-dot chain line M2 represents the flutter characteristic of a comparative example of a suspension. In this comparative example, five laser welds are arranged in the width direction of the hinge member, and one laser weld is formed in each of the regions S. The flutter characteristic M1 of the suspension 13 is better than the flutter characteristic M2 of the comparative example because of its lower vibration peak value and narrower frequency band that covers the peak.

Figure 10:
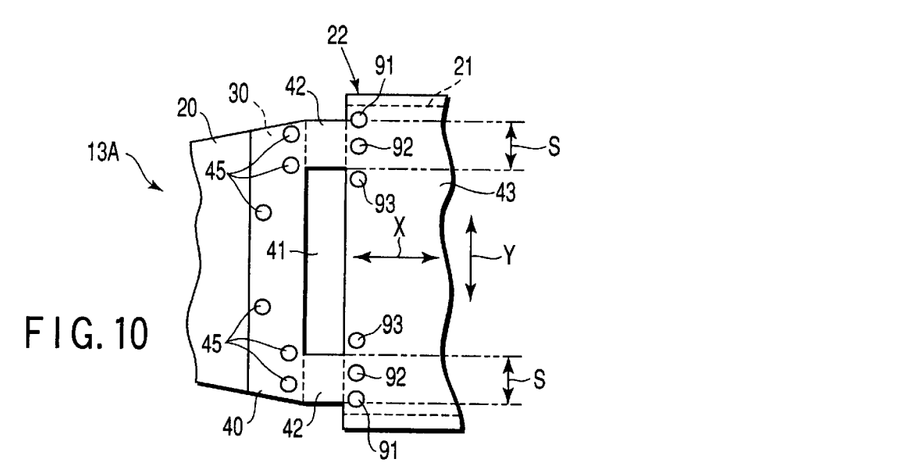
FIG. 10 is a plan view of a part of a disc drive suspension according to a second embodiment of the invention.

FIG. 10 shows a part of a suspension 13A according to a second embodiment of the invention. Three laser welds 91, 92 and 93 are arranged side by side in the width direction (direction of arrow Y) of a hinge member 22 in positions near each of flexible portions 42 of the hinge member 22. At least two laser welds 91 and 92 are situated in each of regions S that extend individually from the flexible portions 42 in the direction of the axis X.

Figure 11:
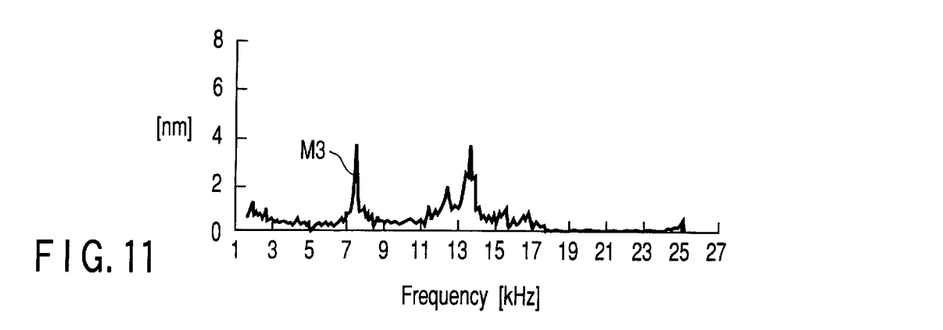
FIG. 11 is a diagram showing the flutter characteristic of the suspension shown in FIG. 10.

A segment M3 shown in FIG. 11 represents the result of measurement of the flutter characteristic of the suspension 13A. The suspension 13A was found to enjoy a satisfactory flutter characteristic, though it is slightly poorer than the flutter characteristic of the suspension 13 of the first embodiment. For other configurations and effects, the suspension 13A of the second embodiment is similar to the suspension 13 of the first embodiment. Therefore, common numerals are used to designate portions that are common to the two suspensions, and a repeated description of those common portions is omitted.

Figure 12:
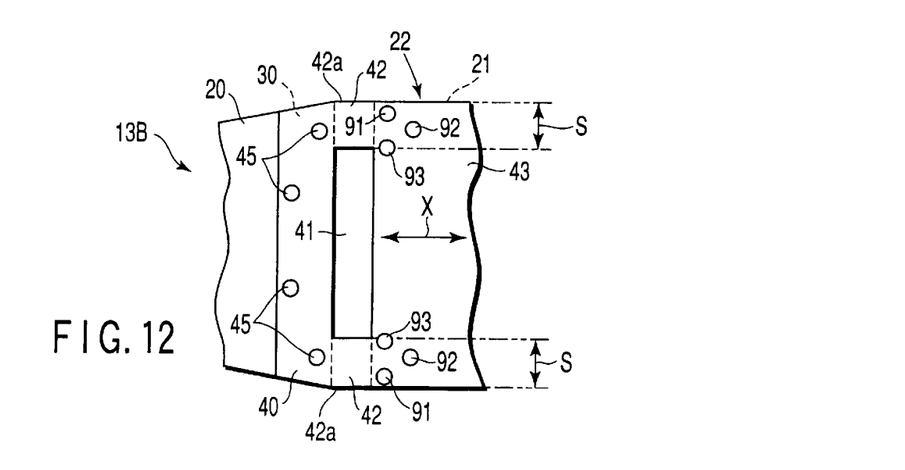
FIG. 12 is a plan view of a part of a disc drive suspension according to a third embodiment of the invention.

FIG. 12 shows a part of a suspension 13B according to a third embodiment of the invention. A side face 42a of each of flexible portions 42 of the suspension 13B is shaped so that it spreads crosswise from a load beam 20 toward a base plate 21. Two or more laser welds 91, 92 and 93 are formed in each of regions S that extend individually from their corresponding flexible portions 42 in the direction of the axis X. The suspension 13B was also found to enjoy the same flutter characteristic of the suspension 13 of the first embodiment.

Figure 13:
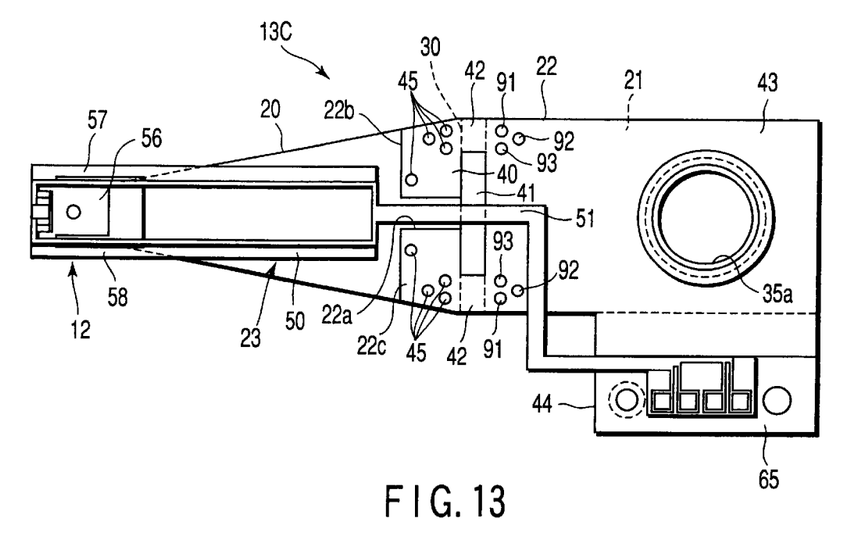
FIG. 13 is a plan view of a disc drive suspension according to a fourth embodiment of the invention.

FIG. 13 shows a suspension 13C according to a fourth embodiment of the invention. A slit 22a is formed in an end portion 40 of a hinge member 22 of the suspension 13C. It extends in the longitudinal direction of the hinge member 22 and opens into an opening 41. Coupling portions 22b and 22c that connect with a load beam 20 are formed on the opposite sides of the slit 22a, individually. A part of a flexure 23 passes through the slit 22a in the longitudinal direction. Since the suspension 13C shares other configurations with the suspension 13 shown in FIG. 1, common numerals are used to designate portions that are common to the two suspensions, and a repeated description of those common portions is omitted.

Figure 14:
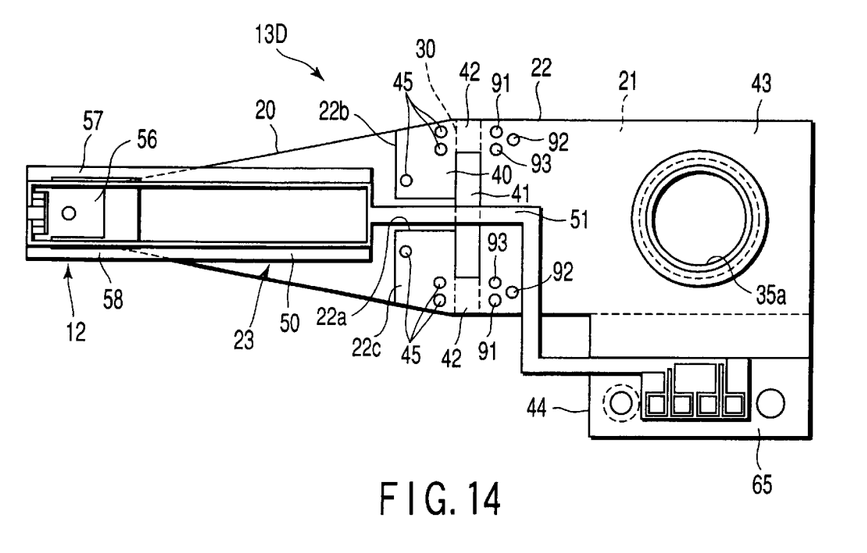
FIG. 14 is a plan view of a disc drive suspension according to a fifth embodiment of the invention.

FIG. 14 shows a suspension 13D according to a fifth embodiment of the invention. A slit 22a is also formed in an end portion 40 of the suspension 13D, and coupling portions 22b and 22c that connect with a load beam 20 are formed on the opposite sides of the slit 22a, individually. A proximal portion 30 of the load beam 20 is fixed to each of the coupling portions 22b and 22c by means of three laser welds 45. A part of a flexure 23 passes through the slit 22a in the longitudinal direction. Since the suspension 13D shares other configurations with the suspension 13 shown in FIG. 1, common numerals are used to designate portions that are common to the two suspensions, and a repeated description of those common portions is omitted.

In carrying out the present invention, it is to be understood that the components of the suspension, including the position and member of laser welds and the shape of the flexible portions, as well as the specific forms of the load beam, base plate, and hinge member, may be variously changed and modified without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disc drive suspension comprising:

a load beam having a proximal portion and a distal end portion;

a base plate formed independently of the load beam; and a hinge member formed independently of the load beam and the base plate and fixed on both the proximal portion of the load beam and the base plate, wherein the hinge member includes an end portion lapped and fixed on the proximal portion of the load beam, a base plate mounting portion lapped and fixed on the base plate, and flexible portions elastically deformable in a thickness direction thereof and situated individually on opposite sides of an opening formed between the end portion and the base plate mounting portion, wherein the hinge member and an end portion of the base plate are fixed on each other by means of laser welds in positions near the flexible portions, wherein at least a part of the laser welds are formed individually on at least two spots in regions extending in an axial direction of the hinge member from the flexible portions.

2. The suspension according to claim 1, wherein the laser welds are formed individually in three positions corresponding to vertices of a triangle in an area near each of the flexible portions of the hinge member, and two of the three laser welds are arranged side by side in a width direction of the hinge member.

3. The suspension according to claim 1, wherein the laser welds are formed individually in three positions near each of the flexible portions of the hinge member so as to be arranged side by side in a width direction of the hinge member.

* * * * *